(12) United States Patent
Wang

(10) Patent No.: US 7,841,567 B2
(45) Date of Patent: Nov. 30, 2010

(54) SUPPORT STAND FOR FLAT-PANEL DISPLAY MONITOR AND ELEVATING SUPPORT USED FOR SUPPORT STAND

(75) Inventor: Jin-Xin Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/422,358

(22) Filed: Apr. 13, 2009

(65) Prior Publication Data

US 2010/0123053 A1   May 20, 2010

(30) Foreign Application Priority Data

Nov. 17, 2008   (CN) .................. 2008 1 0305596

(51) Int. Cl.
*A47F 5/12* (2006.01)
(52) U.S. Cl. ............... 248/136; 248/150; 248/274.1; 248/923; 361/679.21
(58) Field of Classification Search ............. 248/133, 248/136, 150, 371, 274.1, 291.1, 292.11, 248/292.13, 157, 125.1, 122.1, 917, 923; 361/679.21
See application file for complete search history.

(56) References Cited

U.S. PATENT DOCUMENTS

| | | | | |
|---|---|---|---|---|
| 7,431,254 B2* | 10/2008 | Cheng | .................. | 248/292.12 |
| 7,593,218 B2* | 9/2009 | Hwang et al. | .......... | 361/679.21 |
| 7,597,302 B2* | 10/2009 | Lee et al. | .................... | 248/371 |
| 7,628,365 B2* | 12/2009 | Lee | .................. | 248/297.21 |
| 2007/0040077 A1* | 2/2007 | Baek et al. | .................. | 248/133 |
| 2007/0272809 A1* | 11/2007 | Jang | .......................... | 248/133 |
| 2008/0192417 A1* | 8/2008 | Hwang et al. | ............... | 361/681 |
| 2010/0084522 A1* | 4/2010 | Zhou et al. | ............... | 248/124.1 |
| 2010/0096518 A1* | 4/2010 | Wang et al. | ............. | 248/125.7 |
| 2010/0108829 A1* | 5/2010 | Zhou | ....................... | 248/125.1 |
| 2010/0123054 A1* | 5/2010 | Yuan et al. | ............... | 248/125.7 |

* cited by examiner

*Primary Examiner*—Ramon O Ramirez
(74) *Attorney, Agent, or Firm*—Steven M. Reiss

(57) ABSTRACT

The support stand for a flat-panel display monitor includes a rotatable bracket, a hinge assembly, a base member, a first and a second link brackets. The hinge assembly includes a connecting piece, and a pivotal shaft inserted through the connecting piece and the rotatable bracket. The pivotal shaft forms a restricting flange. The base member includes a supporting block forming a restricting pole. The first link bracket forms two limiting protrusions on the first and second end portions. The first end portions of the first and second link brackets are rotatably connected to the connecting piece, the second end portions of the first and second link brackets are rotatably connected to the supporting block. The two limiting protrusions of the first link bracket abut the restricting flange and the restricting pole respectively, thus adjusting the support stand to move between a first utmost position and a second utmost position.

20 Claims, 4 Drawing Sheets

SUPPORT STAND FOR FLAT-PANEL DISPLAY MONITOR AND ELEVATING SUPPORT USED FOR SUPPORT STAND

BACKGROUND

1. Technical Field

The present disclosure generally relates to support stands and elevating supports, particularly, to a support stand for a flat-panel display monitor and an elevating support.

2. Description of Related Art

Flat-panel display monitors, such as liquid crystal display monitors, offer advantages over cathode ray tube displays, such as reduced size, smaller weight, and better image quality. A viewing angle and height of the flat-panel display monitor can be adjusted without moving a support stand of the flat-panel display monitor because of its small weight.

A typical support stand generally includes a bracket to attach to the flat-panel display monitor, a rotatable bracket to fix the bracket, an elevating mechanism, a support member, and a base member to mount the support member. A first end of the elevating mechanism is rotatably connected to the rotatable bracket and a second end of the elevating mechanism is supported by the support member.

The elevating mechanism includes a link bracket defining a curved retaining groove. The support member includes an inner side portion and a retaining piece formed at the inner side portion corresponding to the curved retaining groove. The retaining piece of the support member engages in the curved retaining groove of the link bracket to restrict an adjusting range of the height of the flat-panel display monitor. However, the retaining piece may be easily abraded or damaged by an exterior force. As a result, the support member may have a low impact resistance and a undesirable limiting effect.

What is needed, therefore, is a new support stand for a flat-panel display monitor that overcomes the above mentioned disadvantages.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION

Figure 1:
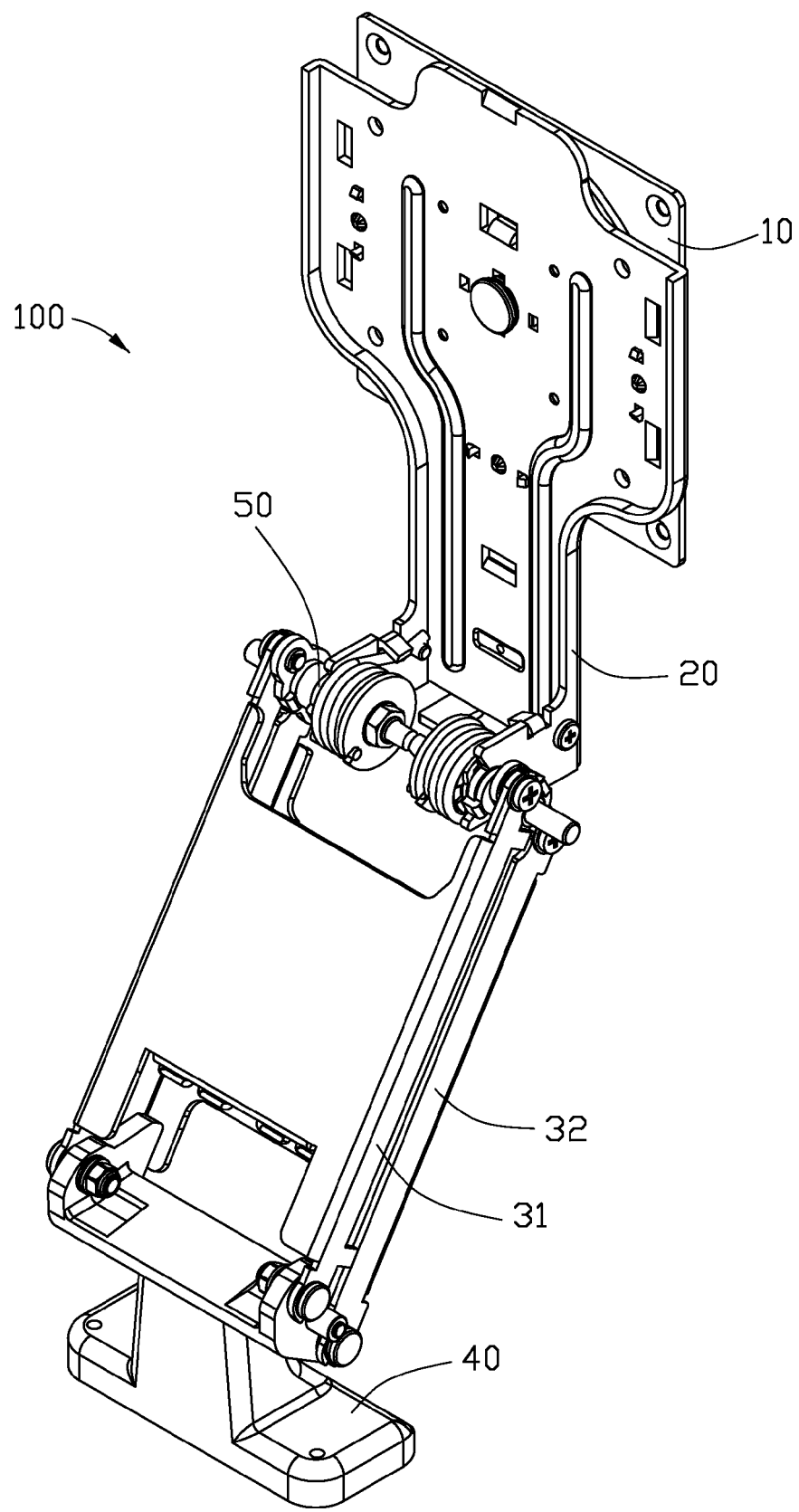
FIG. 1 is an assembled, isometric view of an embodiment of a support stand for a flat-panel display monitor.

Referring to FIG. 1, a support stand 100 for a flat-panel display monitor includes a monitor bracket 10 to hold the flat-panel display monitor, a rotatable bracket 20 to fix the monitor bracket 10, a first link bracket 31, a second link bracket 32, a base member 40, and two hinge assemblies 50. The first and second link brackets 31, 32 are rotatably mounted between the rotatable bracket 20 and the base member 40 by the hinge assemblies 50.

Figure 2:
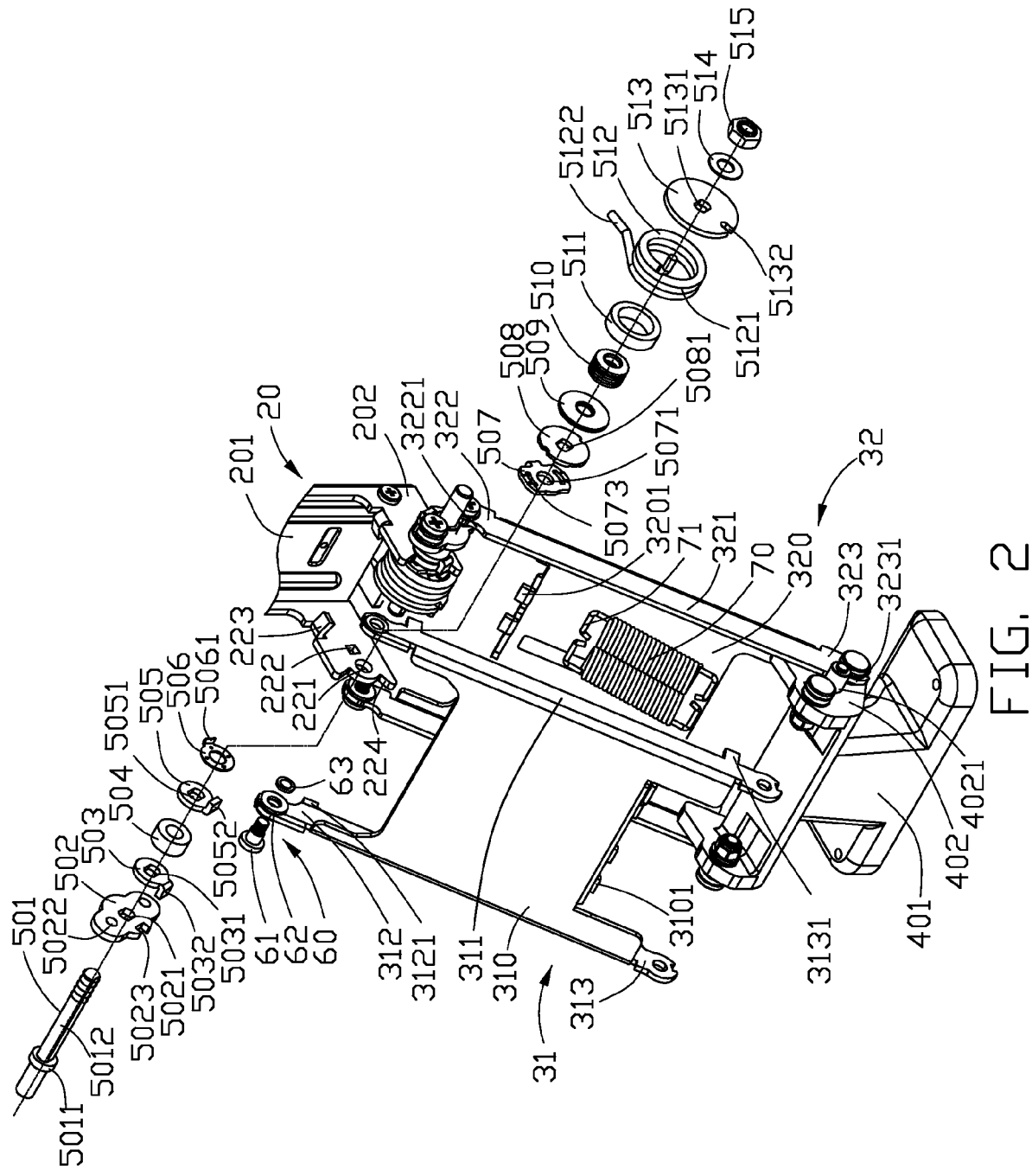
FIG. 2 is an exploded, isometric view of the support stand in FIG. 1.

Referring also to FIG. 2, the rotatable bracket 20 includes a mounting board 201, and two side walls 202 extending from opposite sides of the mounting board 201. The mounting board 201 is fixed to the monitor bracket 10. Each of the side walls 202 defines a pivot hole 221, and a fixing groove 222 adjacent to the pivot hole 221. A restricting tab 223 is formed on each side wall 202 adjacent to the mounting board 201. Each of the side walls 202 also defines a curved groove 224 in an end away from the mounting board 201.

The first link bracket 31 may be substantially H-shaped, and includes a link sheet 310 and two side walls 311 extending substantially perpendicularly from opposite sides of the link sheet 310 correspondingly. The link sheet 310 includes at least one latching hook 3101 formed at a bottom end. Each of the side walls 311 includes a first end portion 312 and a second end portion 313 formed at opposite ends of the side wall 311. The first end portion 312 defines a first substantially circular hole (not labeled) in a middle portion, and forms a first limiting protrusion 3121 on an edge portion. The second end portion 313 defines a second substantially circular hole (not labeled) in a middle portion, and forms a second limiting protrusion 3131 on an edge portion.

The second link bracket 32 is similar in principle to the first link bracket 31. The second link bracket 32 may also be substantially H-shaped and includes a link sheet 320. The link sheet 320 includes at least one latching hook 3201 formed at a top end. The second link bracket 32 also includes two side walls 321 extending substantially perpendicularly from opposite sides of the link sheet 320. Each of the side walls 321 includes a first end portion 322 defining a first limiting groove 3221 and a second end portion 323 defining a second limiting groove 3231.

The base member 40 includes a substantially I-shaped holder 401, and two supporting blocks 402 extending substantially perpendicularly from opposite ends of a top portion of the holder 401. Each of the supporting block 402 forms a restricting pole 4021 on a middle portion, and defines two pivot holes (not shown) in two ends of the supporting block 402.

Each hinge assembly 50 includes a pivotal shaft 501, a connecting piece 502, a protecting washer 503, a sleeve 504, a limiting washer 505, a frictional washer 506, a stationary washer 507, a rotating washer 508, a resisting member 509, a resilient member 510, a ring 511, a torsion spring 512, a resisting piece 513, a washer 514, and a fastening member 515.

The pivotal shaft 501 includes a restricting flange 5011, and a shaft portion 5012 extending from the restricting flange 5011 along an extending direction of the pivotal shaft 501. A cross-section of the shaft portion 5012 may be non-circular. In the illustrated embodiment, the opposite sides of the shaft portion 5012 are flattened, thereby forming a deformed shaft portion. A threaded portion (not labeled) formed on a distal end of the shaft portion 5012 opposite to the restricting flange 5011.

The connecting piece 502 defines a deformed through hole 5021 in a middle portion so that the connecting piece 502 is non-rotatably sleeved on the pivotal shaft 501. The connecting piece 502 also defines two substantially circular through holes 5022 in two ends, and a notch 5023 in an edge portion adjacent to the deformed through hole 5021.

The protecting washer 503 defines a deformed through hole 5031 in a middle portion so that the protecting washer 503 is non-rotatably sleeved on the pivotal shaft 501. A fixing tab 5032 is formed on an edge portion of the protecting washer 503 to be inserted in the notch 5023 of the connecting piece 502.

The sleeve 504 may be substantially cylinder, and rotatably sleeved on the pivotal shaft 501.

The limiting washer 505 defines a deformed through hole 5051 in a middle portion so that the limiting washer 505 is non-rotatably sleeved on the pivotal shaft 501. A limiting tab 5052 is formed on an edge portion of the limiting washer 505 to engage with the curved groove 224 of the rotatable bracket 20, thus defining a rotatable range of the rotatable bracket 20.

The frictional washer 506 defines a substantially circular through hole (not labeled) in a middle portion so that the frictional washer 506 is rotatably sleeved on the pivotal shaft 501. A positioning tab 5061 is formed on an edge portion of the frictional washer 506 to insert in the fixing groove 222 of the rotatable bracket 20. The frictional washer 506 also defines a plurality of lubricating oil grooves (not labeled) in a side surface.

The stationary washer 507 defines a substantially circular through hole 5071 in a middle portion so that the stationary washer 507 is rotatably sleeved on the pivotal shaft 501. The stationary washer 507 also defines two positioning grooves 5073 in a side surface, and forms a retaining tab (not shown) on an edge portion to insert in the fixing groove 222 of the rotatable bracket 20.

The rotating washer 508 defines a deformed through hole 5081 in a middle portion so that the rotating washer 508 is non-rotatably sleeved on the pivotal shaft 501. The rotating washer 508 forms two positioning protrusions (not shown) in a side surface to engage in the positioning grooves 5073 of the stationary washer 507.

The resisting member 509 may be a plurality of resisting washers contacting each other, and rotatably sleeved on the pivotal shaft 501.

The resilient member 510 may be a plurality of spring washers contacting each other, and rotatably sleeved on the pivotal shaft 501. Alternatively, the resilient member 510 may be helical springs, elastic rubber rings, or cylinders.

The torsion spring 512 includes a plurality of spring rings 5121, and two torsion portions 5122 extending from the opposite ends of the torsion spring 512.

The resisting piece 513 defines a deformed through hole 5131 in a middle portion so that the resisting piece 513 is non-rotatably sleeved on the pivotal shaft 501. The resisting piece 513 also defines a cutout 5132 in an edge portion to receive one of the torsion portions 5122 of the torsion spring 512.

The fastening member 515 may be a nut engaging with the threaded portion of the pivotal shaft 501 to keep the components between the restricting flange 5011 and the fastening member 515 together.

The support stand 100 further includes eight connecting modules 60 and a plurality of tension springs 70.

Each connecting module 60 includes a connecting shaft 61, a pair of frictional washers 62, and a fixing member 63.

The tension spring 70 includes two hooks 71 extending from opposite end portions of the tension spring 70.

To assemble the support stand 100, the shaft portion 5012 of the pivotal shaft 501 passes through the connecting piece 502, the protecting washer 503, the sleeve 504, the limiting washer 505, the frictional washer 506, the pivot hole 221 of one side wall 202 of the rotatable bracket 20, the stationary washer 507, the rotating washer 508, the resisting member 509, the resilient member 510, the ring 511, the torsion spring 512, the resisting piece 513, and the washer 514, in that order. The fastening member 515 is engaged with the pivotal shaft 501. The fixing tab 5032 of the protecting washer 503 is fixed in the notch 5023 of the connecting piece 502, so that the protecting washer 503 is fixed to the connecting piece 502 to prevent the connecting piece 502 from abrasion. The limiting tab 5052 of the limiting washer 505 engages with the curved groove 224 of the rotatable bracket 20, thus defining a rotatable range of the rotatable bracket 20. The positioning tab 5061 of the frictional washer 506 and the retaining tab of the stationary washer 507 are inserted in the fixing groove 222 from the opposite sides of the side wall 202. One torsion portion 5122 of the torsion spring 512 is latched at a bottom surface of the restricting tab 223 of the rotatable bracket 20, and the other torsion portion 5122 of the torsion spring 512 is latched in the cutout 5132 of the resisting piece 513.

The first and second link brackets 31, 32 may be assembled as follows. One hook 71 of the tension spring 70 is fixed to the latching hook 3101 of the first link bracket 31 and the other hook 71 is fixed to the latching hook 3201 of the second link bracket 32. The connecting shaft 61 passes through one frictional washer 62, the first end portion 312 of the first link bracket 31, the other frictional washer 62, one circular through hole 5022 of the connecting piece 502, and finally engaged with the fixing member 63, such that, the first end portion 312 of the first link bracket 31 is rotatably assembled on one end of the connecting piece 502. Accordingly, the corresponding first end portion 322 of the second link bracket 32 is rotatably assembled on the other end of the connecting piece 502 by the connecting module 60. Similarly, the corresponding second end portions 313, 323 of the first and second link brackets 31, 32 are respectively assembled on two ends of the supporting block 402 of the base member 40.

When the support stand 100 is used for supporting a flat-panel display monitor, the monitor bracket 10 of the support stand 100 is fixed to a display body (not shown) of the flat-panel display monitor. In use, a force is applied on the display body to rotate the display body with the rotatable bracket 20 along an axis of the pivotal shaft 501 relative to the first and second link brackets 31, 32, thereby adjusting the viewing angle of the flat-panel display monitor. The resilient member 510 becomes compressed and creates an axial force to make the components of the hinge assembly 50 to contact each other tightly. Thus, the display body may be stably maintained at a desired angle relative to the first and second link brackets 31, 32 due to the frictional forces generated between the components of the hinge assembly 50. A torsion force of the torsion spring 512 either increases or decreases according to the rotation of the rotatable bracket 20, thereby preventing an excessive force from damaging the hinge assembly 50.

Figure 3:
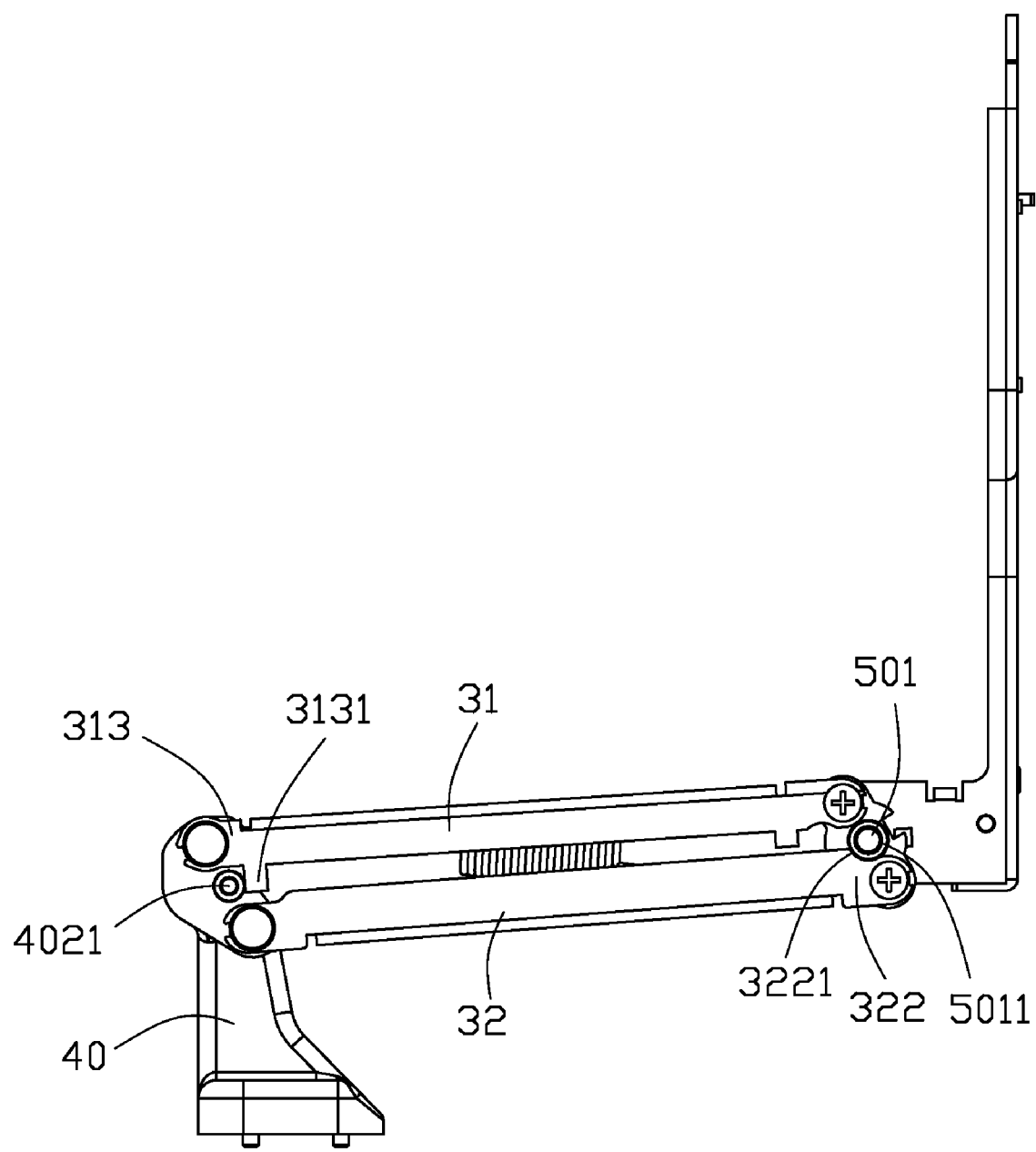
FIG. 3 is a side view of the support stand of FIG. 1, showing the support stand at a first utmost position (lowest position).

Referring to FIG. 3, the support stand 100 is in a first utmost position (lowest position). The second limiting protrusion 3131 of the second end portion 313 of the first link bracket 31 abuts the restricting pole 4021 of the base member 40. Simultaneously, the first limiting groove 3221 of the first end portion 322 of the second link bracket 32 abuts the restricting flange 5011 of the pivotal shaft 501. Thus, the rotatable bracket 20, together with the display body, is restricted in a minimum height.

When the height of the display body needs to be raised, the display body is pushed upwards so that the first and second link brackets 31, 32 are moved to increase the height of the display body. During the adjusting process, the height of the flat-panel display monitor changes, but the viewing angle of the flat-panel display monitor remains the same. When the flat-panel display monitor is lifted to a desired height, the flat-panel display monitor can be stably maintained at the desired height by frictional forces generated between the components of the connecting modules 60.

Figure 4:
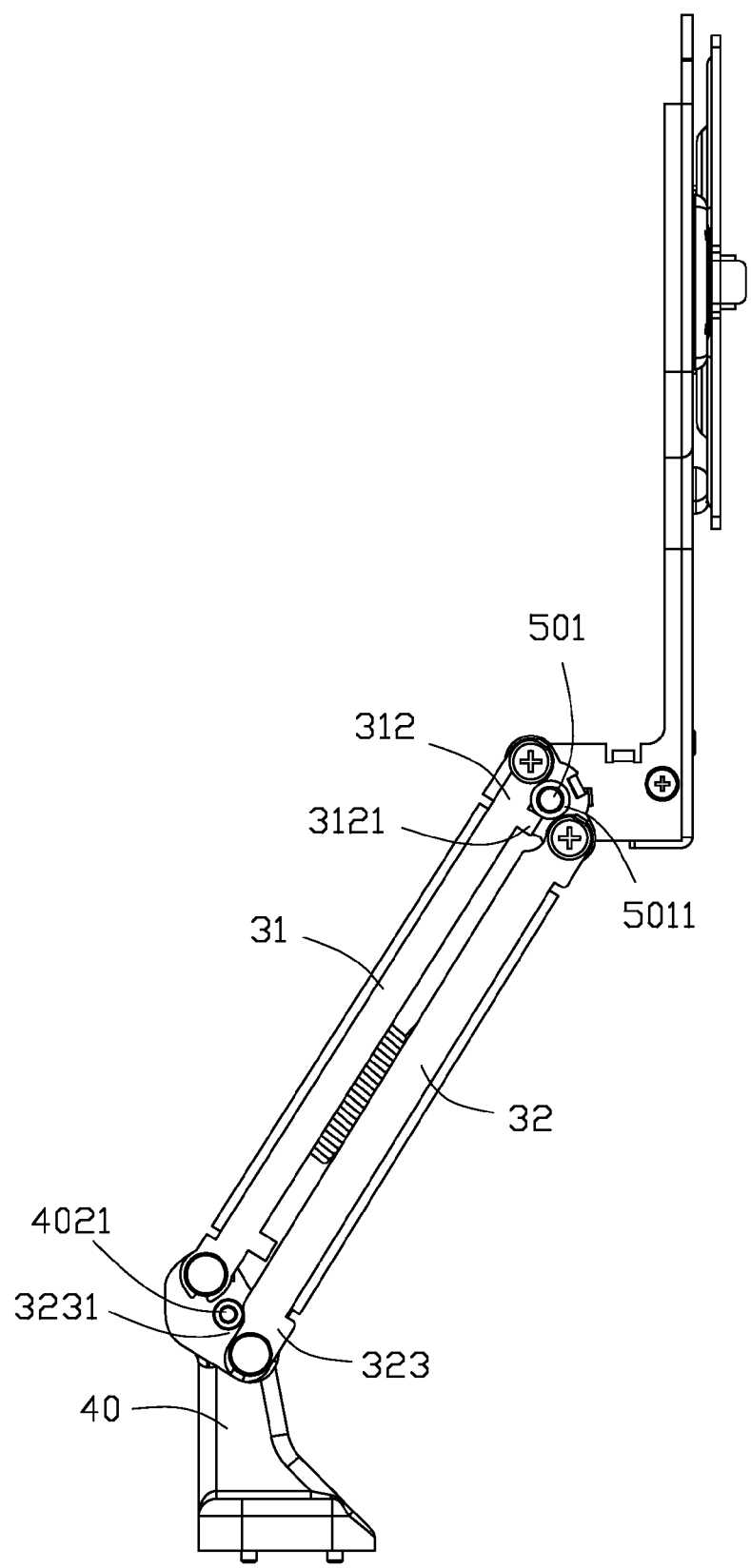
FIG. 4 is similar to FIG. 3, but showing the support stand at a second utmost position (highest position).

Referring to FIG. 4, the support stand 100 is in a second utmost position (highest position), the first limiting protrusion 3121 of the first end portion 312 of the first link bracket 31 abuts the restricting flange 5011 of the pivotal shaft 501. Simultaneously, the second limiting groove 3231 of the second end portion 323 of the second link bracket 32 abuts the restricting pole 4021 of the base member 40. Thus, the rotatable bracket 20 together with the display body is restricted at a maximum height.

In the illustrated embodiment, the restricting poles 4021 and the restricting flange 5011 are strong enough, and therefore difficult to be abraded or damaged by an exterior force. In addition, a torsion force of the tension spring 70 either increases or decreases according to the motion of the first and second link brackets 31, 32, thereby further preventing an excessive force from damaging the support stand 100. Thus, the support stand 100 has a relatively long usage life.

In alternative embodiments, the first and second limiting protrusion 3121, 3131 may be formed on the second link bracket 32, and the first and second limiting groove 3221, 3231 may be defined in the first link bracket 31. The first and second limiting groove 3221, 3231 may be omitted, so that the first and second limiting protrusion 3121, 3131 abut the restricting flange 5011 and the restricting poles 4021 respectively, thus restricting the height of the flat-panel display monitor. The monitor bracket 10 may also be omitted, and the flat-panel display monitor may be directly fixed on the rotatable bracket 20.

It should be pointed that the first and second link brackets 31, 32, the supporting blocks 402 and the connecting pieces 502 cooperatively form an elevating support including a pair of four-bar linkage structures. The elevating support as a whole unit can be used by itself to realize the supporting and restricting functions. The restricting flanges 5011 should then be fixed on the connecting pieces 502.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A support stand for a flat-panel display monitor, comprising:
    a rotatable bracket;
    a hinge assembly comprising a connecting piece, and a pivotal shaft inserted through the connecting piece and the rotatable bracket;
    a base member comprising a supporting block;
    a first link bracket comprising a first end portion and a second end portion; and
    a second link bracket comprising a first end portion and a second end portion, the first end portions of the first and the second link brackets rotatably connecting to the connecting piece, and the second end portions of the first and the second link brackets rotatably connecting to the supporting block;
    wherein the first link bracket forms a first limiting protrusion on the first end portion, and a second limiting protrusion on the second end portion; the pivotal shaft forms a restricting flange; the supporting block forms a restricting pole; the first limiting protrusion of the first link bracket abuts the restricting flange and the second limiting protrusion of the first link bracket abuts the restricting pole, thus adjusting the support stand to move between a first utmost position and a second utmost position.

2. The support stand of claim 1, wherein the second link bracket defines a first limiting groove in the first end portion, and a second limiting groove in the second end portion; the first limiting groove of the second link bracket abuts the restricting flange and the second limiting groove of the second link bracket abuts the restricting pole.

3. The support stand of claim 1, wherein the rotatable bracket comprises a mounting board, and two side walls extending from opposite sides of the mounting board, each of the side walls defines a pivot hole; the pivotal shaft is inserted through the pivot hole of each side wall.

4. The support stand of claim 3, wherein one of the side walls defines a curved groove in an end away from the mounting board; the hinge assembly further comprises a limiting washer non-rotatably sleeved on the pivotal shaft; the limiting washer forms a limiting tab on an edge portion to engage with the curved groove, thus defining a rotatable range of the rotatable bracket.

5. The support stand of claim 3, wherein one of the side walls forms a restricting tab adjacent to the mounting board; the hinge assembly further comprises a resisting piece non-rotatably sleeved on the pivotal shaft, and a torsion spring rotatably sleeved on the pivotal shaft; the resisting piece defines a cutout in an edge portion; the torsion spring comprises a first torsion portion latched at a bottom surface of the restricting tab of the rotatable bracket, and a second torsion portion latched in the cutout of the resisting piece.

6. The support stand of claim 1, wherein the hinge assembly further comprises a stationary washer rotatably sleeved on the pivotal shaft, and a rotating washer non-rotatably sleeved on the pivotal shaft; the stationary washer defines a positioning groove in a side surface, the rotating washer forms a positioning protrusion in a side surface to engage in the positioning groove of the stationary washer.

7. The support stand of claim 1, wherein the connecting piece defines a notch in an edge portion, the hinge assembly further comprises a protecting washer non-rotatably sleeved on the pivotal shaft; the protecting washer forms a fixing tab on an edge portion to insert in the notch of the connecting piece.

8. The support stand of claim 1, wherein the hinge assembly further comprises a frictional washer, a resisting member, a resilient member, and a fastening member sleeved on the pivotal shaft to provide frictional force for the rotatable bracket.

9. The support stand of claim 1, wherein each of the first and the second link brackets is substantially H-shaped, and comprises a link sheet and two side walls extending from two sides of the link sheet; the first end portion and the second end portion are formed at two ends of each side wall.

10. The support stand of claim 9, further comprising a plurality of connecting modules; the first end portions of the first and the second link brackets are rotatably assembled on two ends of the connecting piece by the connecting modules; the second end portions of the first and the second link brackets are rotatably assembled on two ends of the supporting block by the connecting modules.

11. The support stand of claim 9, wherein the link sheet of the first link bracket comprises a latching hook formed at a bottom end thereof; the link sheet of the second link bracket comprises a latching hook formed at a top end thereof; the support stand further comprises at least one tension spring having two hooks extending from opposite end portions thereof, one hook of the tension spring is fixed to the latching hook of the first link bracket and the other hook of the tension spring is fixed to the latching hook of the second link bracket.

12. An elevating support, used for a support stand of a flat-panel display monitor, the elevating support comprising:
    a first link bracket comprising a first end portion and a second end portion;

a second link bracket comprising a first end portion and a second end portion;

a connecting piece rotatably connecting the first end portions of the first and the second link brackets; and a supporting block rotatably connecting the second end portions of the first and the second link brackets;

wherein the first link bracket forms a first limiting protrusion on the first end portion, and a second limiting protrusion on the second end portion; the connecting piece forms a restricting flange;

the supporting block forms a restricting pole; the first limiting protrusion of the first link bracket abuts the restricting flange and the second limiting protrusion of the first link bracket abuts the restricting pole, thus adjusting the elevating support to move between a first utmost position and a second utmost position.

13. The elevating support of claim 12, wherein the second link bracket defines a first limiting groove in the first end portion, and a second limiting groove in the second end portion;

the first limiting groove of the second link bracket abuts the restricting flange and the second limiting groove of the second link bracket abuts the restricting pole.

14. The elevating support of claim 12, wherein each of the first and the second link brackets is substantially H-shaped, and comprises a link sheet and two side walls extending from two sides of the link sheet; the first end portion and the second end portion are formed at two ends of each side wall.

15. The elevating support of claim 14, wherein the link sheet of the first link bracket comprises a latching hook formed at a bottom end thereof; the link sheet of the second link bracket comprises a latching hook formed at a top end thereof; the elevating support further comprises at least one tension spring having two hooks extending from opposite end portions thereof, one hook of the tension spring is fixed to the latching hook of the first link bracket and the other hook of the tension spring is fixed to the latching hook of the second link bracket.

16. A support stand for a flat-panel display monitor, comprising:

a rotatable bracket;

a hinge assembly comprising a connecting piece, and a pivotal shaft inserted through the connecting piece and the rotatable bracket;

a base member comprising a supporting block;

a first link bracket comprising a first end portion and a second end portion; and a second link bracket comprising a first end portion and a second end portion, the first end portions of the first and the second link brackets rotatably connecting to the connecting piece, the second end portions of the first and the second link brackets rotatably connecting to the supporting block;

wherein the first link bracket forms a first limiting protrusion on the first end portion, and a second limiting protrusion on the second end portion; the second link bracket defines a first limiting groove in the first end portion, and a second limiting groove in the second end portion; the pivotal shaft forms a restricting flange; the supporting block forms a restricting pole;

when the support stand is in a first utmost position, the second limiting protrusion abuts the restricting pole, and the first limiting groove abuts the restricting flange;

when the support stand is in a second utmost position, the first limiting protrusion abuts the restricting flange, and the second limiting groove abuts the restricting pole.

17. The support stand of claim 16, wherein the rotatable bracket defines a curved groove in an end; the hinge assembly further comprises a limiting washer non-rotatably sleeved on the pivotal shaft; the limiting washer forms a limiting tab on an edge portion to engage in the curved groove, thus defining a rotatable range of the rotatable bracket.

18. The support stand of claim 16, wherein the rotatable bracket forms a restricting tab; the hinge assembly further comprises a resisting piece non-rotatably sleeved on the pivotal shaft, and a torsion spring rotatably sleeved on the pivotal shaft; the resisting piece defines a cutout in an edge portion; the torsion spring includes a first torsion portion latched at a bottom surface of the restricting tab of the rotatable bracket, and a second torsion portion latched in the cutout of the resisting piece.

19. The support stand of claim 16, wherein the hinge assembly further comprises a stationary washer rotatably sleeved on the pivotal shaft, and a rotating washer non-rotatably sleeved on the pivotal shaft; the stationary washer defines a positioning groove in a side surface, the rotating washer forms a positioning protrusion in a side surface to engage in the positioning groove of the stationary washer.

20. The support stand of claim 16, further comprising a monitor bracket fixed on the rotatable bracket and connected to the flat-panel display monitor.

* * * * *